(12) United States Patent
Nakai et al.

(10) Patent No.: US 8,021,793 B2
(45) Date of Patent: Sep. 20, 2011

(54) HYDROGEN PRODUCING APPARATUS AND FUEL CELL SYSTEM USING THE SAME

(75) Inventors: Toshihiro Nakai, Osaka (JP); Hiroshi Kashino, Osaka (JP); Takeshi Miki, Osaka (JP); Shoji Saibara, Osaka (JP)

(73) Assignee: Hitachi Maxell Energy, Ltd., Kyoto (JP)

( * ) Notice: Subject to any disclaimer, the term of this patent is extended or adjusted under 35 U.S.C. 154(b) by 701 days.

(21) Appl. No.: 12/092,061

(22) PCT Filed: Oct. 30, 2006

(86) PCT No.: PCT/JP2006/321660
§ 371 (c)(1),
(2), (4) Date: Apr. 29, 2008

(87) PCT Pub. No.: WO2007/052607
PCT Pub. Date: May 10, 2007

(65) Prior Publication Data
US 2009/0098424 A1   Apr. 16, 2009

(30) Foreign Application Priority Data

Oct. 31, 2005 (JP) .................. 2005-316422
Apr. 13, 2006 (JP) .................. 2006-110365
Apr. 18, 2006 (JP) .................. 2006-113965
Apr. 20, 2006 (JP) .................. 2006-116253

(51) Int. Cl.
*H01M 8/06* (2006.01)
*H01M 8/10* (2006.01)
*C01B 3/08* (2006.01)

(52) U.S. Cl. ............. 429/416; 429/492; 48/61; 423/657

(58) Field of Classification Search .................. 423/657; 429/408, 416, 492; 48/61
See application file for complete search history.

(56) References Cited

U.S. PATENT DOCUMENTS 5,593,640 A * 1/1997 Long et al. .................. 422/111
6,506,360 B1   1/2003 Andersen et al.
(Continued)

FOREIGN PATENT DOCUMENTS
JP        2566248 B2   10/1996
(Continued)

OTHER PUBLICATIONS

Machine generated English translation of JP 2004-149394 A published on May 27, 2004.
(Continued)

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

A hydrogen producing apparatus according to the present invention includes a hydrogen-generating-material containing vessel 1 for containing a hydrogen generating material, a water containing vessel 2 for containing water, a water supply portion for supplying water from the water containing vessel 2 to the hydrogen-generating-material containing vessel 1, a hydrogen outflow portion for leading out hydrogen from the hydrogen-generating-material containing vessel 1, a gas-liquid separating part 7 for separating water from a mixture of hydrogen and water discharged from the hydrogen-generating-material containing vessel 1, and a water collecting portion for collecting water separated by the gas-liquid separating part 7 into the water containing vessel 2.

20 Claims, 6 Drawing Sheets

U.S. PATENT DOCUMENTS

2002/0025462 A1    2/2002    Nakanishi et al.
2005/0276748 A1    12/2005    Morioka et al.

FOREIGN PATENT DOCUMENTS

| | | |
|---|---|---|
| JP | 2002-80202 A | 3/2002 |
| JP | 2002-154803 A | 5/2002 |
| JP | 2003-221201 A | 8/2003 |
| JP | 2004-083318 A | 3/2004 |
| JP | 2004-115348 A | 4/2004 |
| JP | 2004-149394 A | 5/2004 |
| JP | 2004-231466 A | 8/2004 |
| WO | WO-2004/018352 A1 | 3/2004 |

OTHER PUBLICATIONS

Machine generated English translation of JP 2004-231466 A published on Aug. 19, 2004.

Machine generated English translation of JP 2566248 B2 published on Dec. 25, 1996.

\* cited by examiner

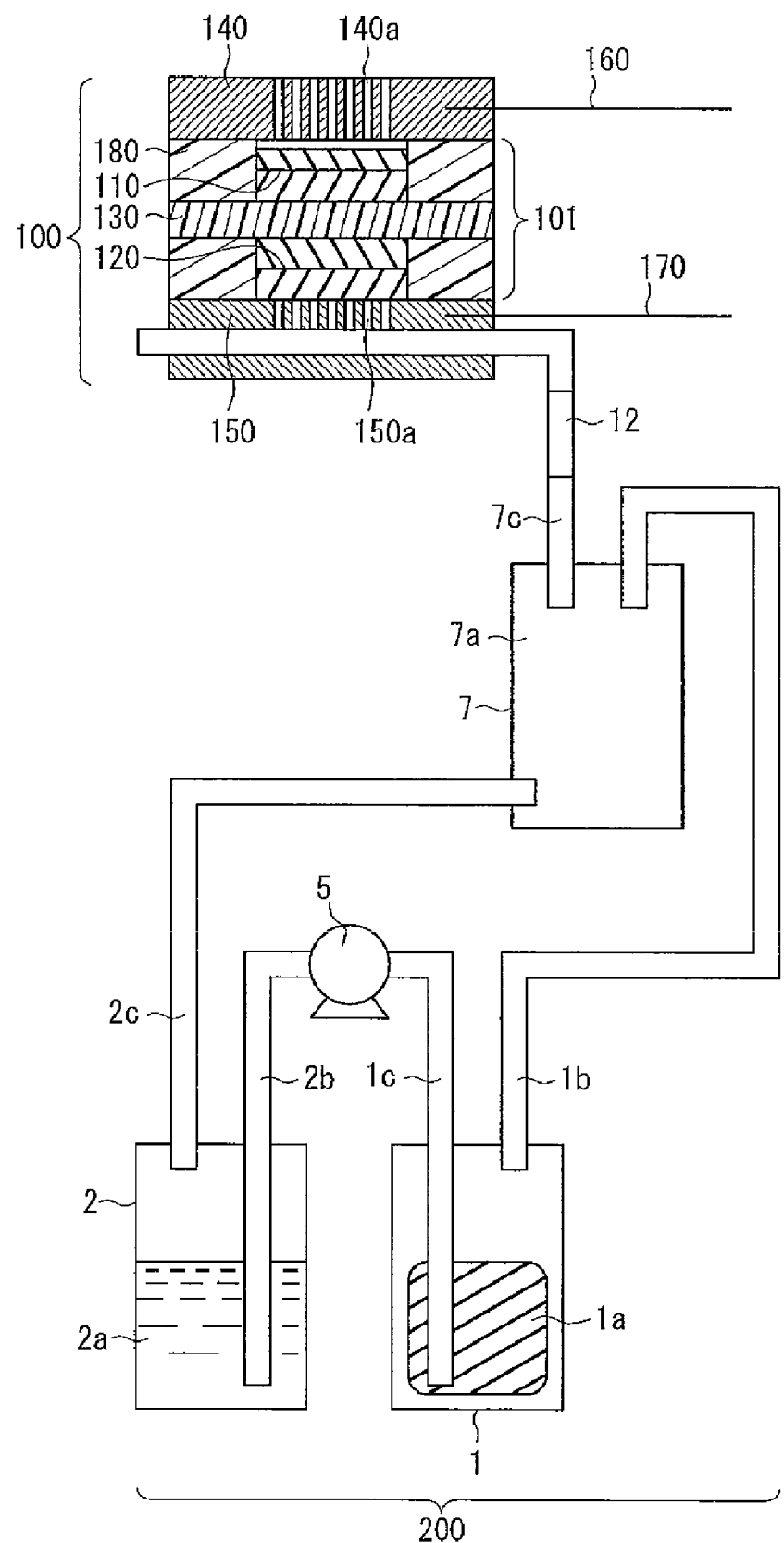
F I G. 4

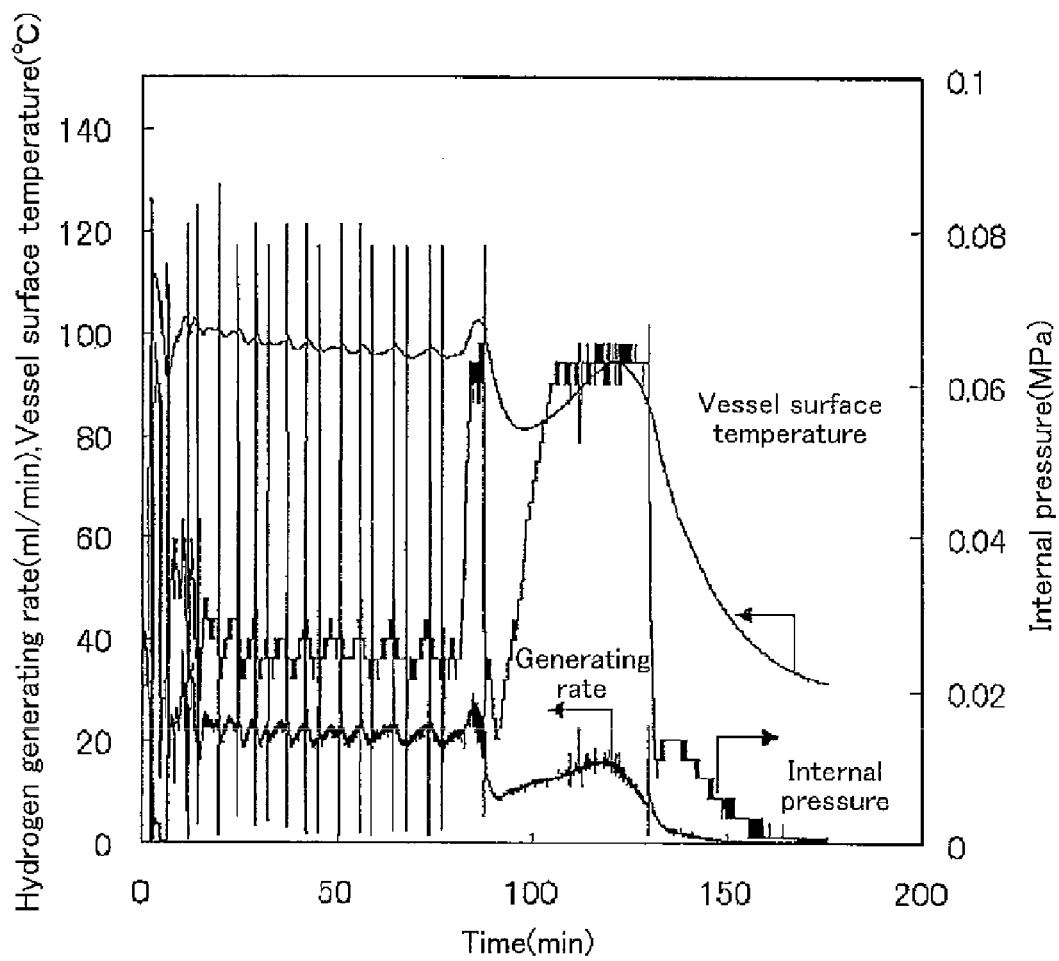
F I G. 6

HYDROGEN PRODUCING APPARATUS AND FUEL CELL SYSTEM USING THE SAME

TECHNICAL FIELD

The present invention relates to a hydrogen producing apparatus for allowing a hydrogen generating material and water to react with each other so as to produce hydrogen, and a fuel cell system including this hydrogen producing apparatus and a fuel cell.

BACKGROUND ART

In recent years, with the widespread use of cordless equipment such as personal computers and mobile phones, there has been an increasing demand that batteries serving as their power sources have a smaller size and a higher capacity. Owing to its high energy density and its potential for reduction in size and weight, a lithium ion secondary battery is now put to practical use and growing in demand as a portable power source. However, this lithium ion secondary battery cannot ensure sufficient hours of continuous use for some types of cordless equipment.

In an attempt to solve the problem mentioned above, a fuel cell, for example, a polymer electrolyte fuel cell (PEFC) has been under development. The fuel cell can be used continuously as long as a fuel and oxygen are supplied. The PEFC, which uses a solid polymer electrolyte as an electrolyte, oxygen in the air as a positive active material and various kinds of fuels as a negative active material, has attracted attention as a battery achieving a higher energy density than the lithium ion secondary battery.

As the fuel to be used in the PEFC, hydrogen, methanol, etc. have been proposed and developed. Among them, a PEFC using hydrogen as its fuel offers promise because it enables a higher energy density.

In order to supply the fuel cell such as the PEFC with hydrogen, studies have been conducted on, for example, a method of supplying the hydrogen that is produced using a hydrogen producing apparatus capable of allowing a hydrogen generating material serving as a hydrogen source and water to react with each other so as to generate hydrogen. For instance, such a hydrogen producing apparatus is provided with a tank containing the water and a vessel containing the hydrogen generating material and allowing the hydrogen generating material and water to react with each other and has a mechanism in which the water is supplied from the tank containing the water to the vessel containing the hydrogen generating material (a reactor), the hydrogen generating material and the water are caused to react with each other in that vessel, and the generated hydrogen is supplied to the fuel cell via a hydrogen outflow pipe provided in this vessel.

However, at the time of reaction between the hydrogen generating material and the water, unreacted water is ejected together with the hydrogen and discharged to the outside of the reactor. Accordingly, in the conventional hydrogen producing apparatus, the water containing tank has had to hold water in an amount considerably larger than the amount necessary for reaction. Since hydrogen containing such a large amount of water is supplied, a fuel supply line in the fuel cell sometimes has been clogged.

Under such circumstances, in the hydrogen producing apparatus having a mechanism of generating hydrogen by reaction between the hydrogen generating material and water, the unreacted water discharged from the reactor together with the generated hydrogen has to be treated. In response to this, suggestions conventionally have been made to provide a hydrogen producing apparatus having a mechanism in which a mixture of the hydrogen and water (water vapor) discharged from the reactor is returned to the inside of the water containing tank and mixed with the water inside the tank so as to conduct heat exchange, thereby converting the water vapor in the mixture into water, whereas the hydrogen in the mixture is taken out from an outflow pipe provided in an upper portion of the tank and supplied to a fuel cell, etc., for example (Patent document 1). In accordance with the apparatus described in Patent document 1, it is possible to convert the unreacted water discharged from the reactor as water vapor together with the hydrogen back to water inside the water supply tank and supply the water to the reactor again, so that the water can be used efficiently for producing the hydrogen.

However, the water supply tank in Patent document 1 needs to include a pipe for supplying water, a pipe for returning the mixture of hydrogen and water discharged from the reactor and a pipe for discharging hydrogen, so that the structure of the water supply tank becomes complicated. Since the hot mixture of hydrogen and water is returned directly to the water supply tank, the temperature of water inside the water supply tank rises along with the hydrogen production. Accordingly, the water supply tank has to be made of a heat resistant material. Thus, production of the water supply tank with a simple structure using an inexpensive material becomes difficult.

On the other hand, methods conventionally have been suggested in which hydrogen is generated by chemical reaction at a low temperature up to 120° C. and used as a fuel. These methods employ as a hydrogen source a metal that reacts with water and generates hydrogen, for example, aluminum, magnesium, silicon or zinc (Patent documents 2 to 6).

However, in the case of producing hydrogen by the methods disclosed in Patent documents 1 to 6, by-products such as oxides and hydroxides are generated by the above-noted reaction between metals and water. In the produced hydrogen, unreacted water that has not acted in the hydrogen generating reaction is mixed in such a manner as to contain the by-products mentioned above and ions thereof.

When the water containing the above-mentioned by-products and ions thereof is supplied to the polymer electrolyte fuel cell together with hydrogen, protons in a proton exchange resin and a proton exchange membrane included in the polymer electrolyte fuel cell are substituted, adsorbed on a catalyst and deposited in electrodes. This lowers ion conductivity, catalyst function, gas diffusion performance, etc. in the fuel cell, so that the fuel cell is deteriorated.

In light of the above situation, in the case where hydrogen serving as a fuel of the polymer electrolyte fuel cell is obtained by the methods disclosed in Patent documents 1 to 6, water containing the by-products mixed in the hydrogen and the ions thereof is preferably removed in order to prevent the properties of the fuel cell from deteriorating.

Patent document 5 mentioned above has suggested a method in which the by-products contained in the generated hydrogen and the ions thereof are separated together with condensed water using a condensed liquid separating device. Most of the by-products and the ions thereof contained in the hydrogen are separated with this method.

However, the above-described method only can separate a condensed portion in the water contained in the hydrogen and cannot separate water vapor. Thus, there is a problem that, even if the by-products and ions thereof contained in the condensed water droplets can be removed, part of the by-products and ions thereof contained in the water vapor are sent to the fuel cell together with hydrogen.

Also, Patent document 6 mentioned above discloses a mechanism of removing metal ions contained in the hydrogen using a hydrogen separating membrane such as a palladium membrane, a metal ion permselective membrane, molecular sieves or the like. However, the hydrogen separating membrane such as a palladium membrane has a problem of a low hydrogen permeability rate and a high cost. Further, the metal ion permselective membrane and the molecular sieves have a problem of early deterioration because the amount of metal ions that can be removed is limited.

Patent document 1: JP 2004-149394 A
Patent document 2: U.S. Pat. No. 6,506,360
Patent document 3: JP 2566248 B
Patent document 4: JP 2004-231466 A
Patent document 5: WO 04/18352A
Patent document 6: JP 2002-80202 A

DISCLOSURE OF INVENTION

A hydrogen producing apparatus according to the present invention includes a hydrogen-generating-material containing vessel for containing a hydrogen generating material, a water containing vessel for containing water, a water supply portion for supplying water from the water containing vessel to the hydrogen-generating-material containing vessel, a hydrogen outflow portion for leading out hydrogen from the hydrogen-generating-material containing vessel, a gas-liquid separating part for separating water from a mixture of hydrogen and water discharged from the hydrogen-generating-material containing vessel, and a water collecting portion for collecting water separated by the gas-liquid separating part into the water containing vessel.

Further, a fuel cell system according to the present invention includes the above-described hydrogen producing apparatus according to the present invention and a fuel cell.

BRIEF DESCRIPTION OF DRAWINGS

FIG. 4 is a partially cross-sectional schematic view showing an example of a fuel cell system according to the present invention.

FIG. 6 shows the relationship of a hydrogen generating rate and a surface temperature and an internal pressure of a hydrogen-generating-material containing vessel with respect to an elapsed time in a hydrogen producing apparatus in Example 3.

DESCRIPTION OF THE INVENTION

Figure 1:
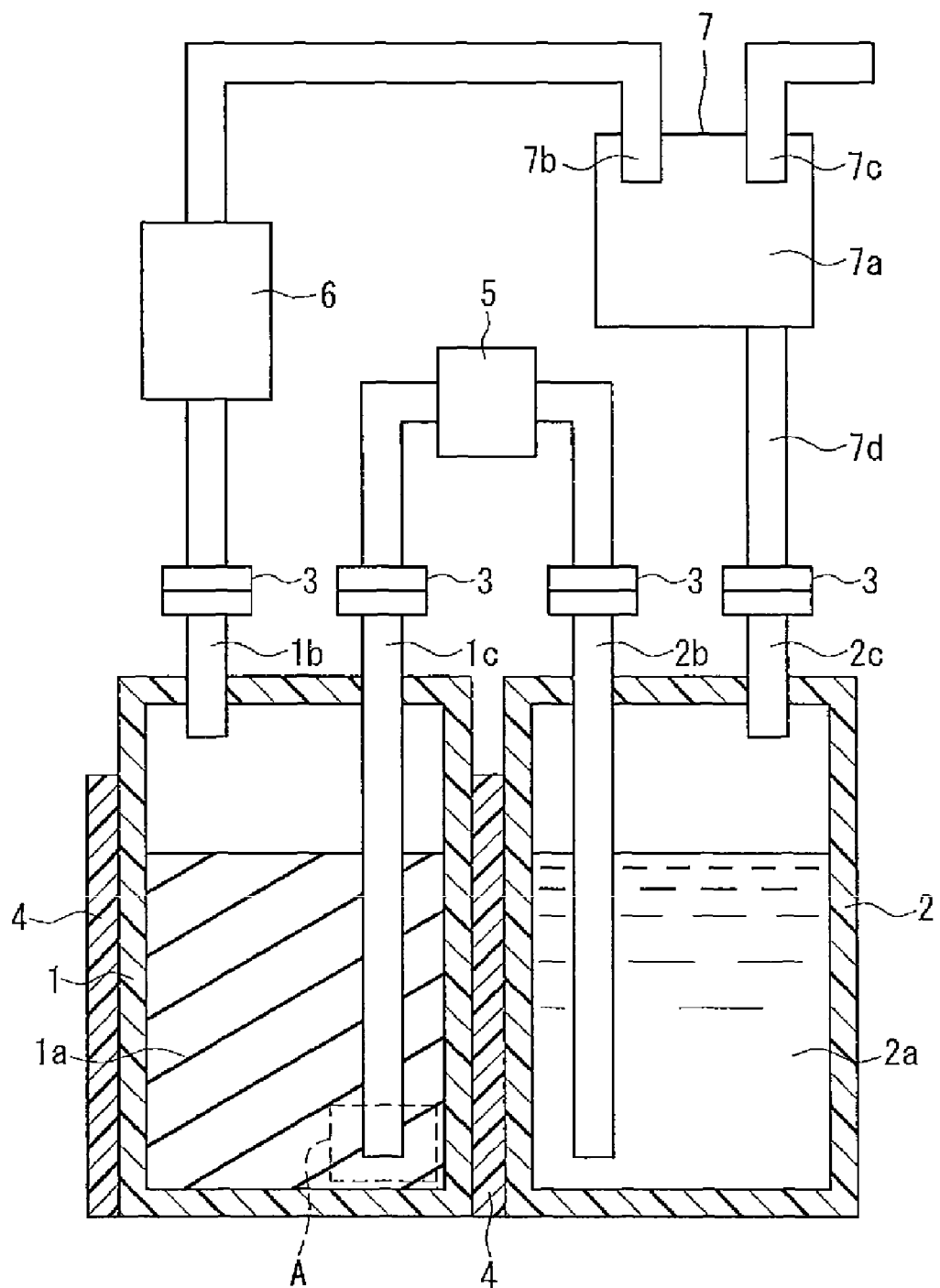
FIG. 1 is a partially cross-sectional schematic view showing an example of a hydrogen producing apparatus according to the present invention.

A hydrogen producing apparatus according to the present invention includes a hydrogen-generating-material containing vessel for containing a hydrogen generating material, a water containing vessel for containing water, a water supply portion for supplying water from the water containing vessel to the hydrogen-generating-material containing vessel, a hydrogen outflow portion for leading out hydrogen from the hydrogen-generating material containing vessel, a gas-liquid separating part for separating water from a mixture of hydrogen and water discharged from the hydrogen-generating-material containing vessel, and a water collecting portion for collecting water separated by the gas-liquid separating part into the water containing vessel.

Further, a fuel cell system according to the present invention includes the above-described hydrogen producing apparatus according to the present invention and a fuel cell.

Since the hydrogen producing apparatus according to the present invention includes the above-described hydrogen-generating-material containing vessel, the above-described water containing vessel, the above-described water supply portion, and the above-described hydrogen outflow portion, it is possible to supply water continuously or intermittently from the above-described water containing vessel to the above-described hydrogen-generating-material containing vessel, and allow the hydrogen generating material and the water to react with each other so as to generate hydrogen, thereby taking out that hydrogen.

Since the hydrogen producing apparatus according to the present invention includes the above-described gas-liquid separating part and the above-described water collecting portion, it is possible to separate the mixture of hydrogen and water discharged from the above-described hydrogen-generating-material containing vessel into the hydrogen and the water by the above-described gas-liquid separating part and return the separated water to the above-described water collecting portion. Consequently, a substantial amount of water to be used can be reduced, thereby producing hydrogen simply and efficiently.

Moreover, since the hydrogen producing apparatus according to the present invention makes it possible to reduce a substantial amount of water to be used as described above, the amount of the water first prepared in the water containing vessel can be reduced. Therefore, the volume and weight of the hydrogen producing apparatus can be reduced, resulting in a compact apparatus.

Additionally, the hydrogen producing apparatus according to the present invention can separate water from the mixture containing the hydrogen and the water (unreacted water that has not been involved in the hydrogen generating reaction) discharged from the hydrogen-generating-material containing vessel by the above-described gas-liquid separating part, thereby removing by-products contained in this water (which are by-products generated by the hydrogen generating reaction and also contains by-product ions). By-products contained in water vapor that cannot be separated by the gas-liquid separating part can be removed by a trapping portion, which will be described later.

Furthermore, in the fuel cell system according to the present invention, the above-mentioned hydrogen producing apparatus according to the present invention capable of producing hydrogen simply and efficiently serves as a hydrogen supply source, thus making it possible to generate electric power efficiently. When the hydrogen produced by the hydrogen producing apparatus according to the present invention is supplied to the fuel cell, the by-products that are contained in the hydrogen and may cause the deterioration of the fuel cell can be removed efficiently before entering the fuel cell. Accordingly, this invention provides a fuel cell system that can prevent decreases in ion conductivity, catalyst function, gas diffusion performance, etc. in the fuel cell over a long period of time, thereby suppressing the deterioration of the fuel cell.

In the following, embodiments of the present invention will be described, with reference to the accompanying drawings.

Embodiment 1

FIG. 1 is a partially cross-sectional schematic view showing an example of a hydrogen producing apparatus according to the present invention. In FIG. 1, numeral 1 denotes a hydrogen-generating-material containing vessel, numeral 1a denotes a hydrogen generating material, numeral 1b denotes a hydrogen outflow pipe, and numeral 1c denotes a water supply pipe. Numeral 2 denotes a water containing vessel, numeral 2a denotes water, numeral 2b denotes a water supply pipe, and numeral 2c denotes a water collecting pipe. Numerals 3 each denotes a detachable portion for connecting a main body portion of the hydrogen producing apparatus and the hydrogen-generating-material containing vessel 1 or the water containing vessel 2, numeral 4 denotes a heat insulator, and numeral 5 denotes a pump. Further, numeral 6 denotes a cooling portion, and numeral 7 denotes a gas-liquid separating part. FIG. 1 shows the cross-sections of only the hydrogen-generating-material containing vessel 1, the water containing vessel 2, the heat insulator 4 and the gas-liquid separating part 7.

In the hydrogen producing apparatus in the present embodiment, the water is supplied from the water containing vessel 2 to the hydrogen-generating-material containing vessel 1, and the hydrogen generating material 1a and the water 2a are allowed to react with each other in the hydrogen-generating-material containing vessel 1 so as to produce hydrogen. Thus, the hydrogen-generating-material containing vessel 1 also serves as a reactor between the hydrogen generating material 1a and the water 2a. The hydrogen generated in the hydrogen-generating-material containing vessel 1 passes through the hydrogen outflow pipe 1b and is supplied to equipment that needs hydrogen (for example, a fuel cell or the like).

As mentioned earlier, when the hydrogen generating material 1a and the water 2a are allowed to react with each other to generate hydrogen in the hydrogen-generating-material containing vessel 1, unreacted water is ejected together with the hydrogen, so that the mixture of the water and the hydrogen is discharged from the hydrogen outflow pipe 1b to the outside of the hydrogen-generating-material containing vessel 1 serving as the reactor. However, since the hydrogen producing apparatus in the present embodiment has the gas-liquid separating part 7, it can separate the mixture of water and hydrogen discharged from the hydrogen-generating-material containing vessel 1 into water and hydrogen in the gas-liquid separating part 7 and return the separated water to the water containing vessel 2.

The gas-liquid separating part 7 is constituted by a water separating vessel 7a for separating water and hydrogen, a hydrogen inflow pipe 7b for introducing the mixture of water and hydrogen to the water separating vessel 7a, a hydrogen outflow pipe 7c for discharging hydrogen separated in the water separating vessel 7a and a water collecting pipe 7d for returning water separated in the water separating vessel 7a to the water containing vessel 2. The water in the mixture of water and hydrogen flowed in from the hydrogen inflow pipe 7b falls toward a lower portion of the water separating vessel 7a by gravity and is separated from the hydrogen. The separated water passes through the water collecting pipe 7d and the water collecting pipe 2c and then is collected in the water containing vessel 2. As described above, the hydrogen producing apparatus in the present embodiment has pipes (the water collecting pipes 2c and 7d) that connect the gas-liquid separating part 7 and the water containing vessel 2 in order to return to the water containing vessel 2 the water separated from the mixture of water and hydrogen discharged from the hydrogen-generating-material containing vessel 1.

As described above, in the apparatus according to the present embodiment, the unreacted water discharged from the hydrogen-generating-material containing vessel 1 together with the generated hydrogen can be returned to the water containing vessel 2 by the function of the gas-liquid separating part 7 and used again for the hydrogen generating reaction. Thus, it becomes possible to reduce a substantial amount of water to be used, so that the amount of the water first prepared in the water containing vessel 2 can be reduced, thereby reducing the volume and weight of the hydrogen producing apparatus, resulting in a compact apparatus.

Further, in the case where a hydrogen producing apparatus is used as a fuel source of a fuel cell, for example, a large amount of water generated together with hydrogen is supplied into the fuel cell, a fuel supply line sometimes becomes clogged. However, in accordance with the hydrogen producing apparatus in the present embodiment, the water is removed from the mixture of water and hydrogen discharged from the hydrogen-generating-material containing vessel 1 in the gas-liquid separating part 7 and then the hydrogen is supplied to the fuel cell. Therefore, the clogging described above can also be prevented.

Moreover, in the hydrogen producing apparatus in the present embodiment, since the water and the hydrogen are separated in the gas-liquid separating part 7 that is provided as a different member from the water containing vessel 2, only the two pipes of the water supply pipe 2b and the water collecting pipe 2c are needed for the water containing vessel 2, simplifying the structure compared with the conventional structure with three pipes in which the water and the hydrogen are separated inside the water containing vessel. The gas-liquid separating part 7 is preferably formed as a member different from not only the water containing vessel 2 but also the hydrogen-generating-material containing vessel 1 as shown in FIG. 1. In this way, the hydrogen-generating-material containing vessel 1 and the water containing vessel 2 can be made to have a simpler structure, so that they can be made compact.

The gas-liquid separating part 7 is preferably disposed at a higher position than the water containing vessel 2 along a vertical direction, in other words, disposed above the water containing vessel 2. Although a pump may be used as a means for returning the water separated in the gas-liquid separating part 7 to the water containing vessel 2, disposing the gas-liquid separating part 7 above the water containing vessel 2 so as to allow the collection of water under its own weight to the water containing vessel 2 achieves efficiency because the need for the power of a pump or the like is eliminated.

The structure of the gas-liquid separating part 7 is not limited to that shown in FIG. 1. For example, as in Embodiment 2 described later, a gas-liquid separating film, such as a polytetrafluoroethylene microporous film and a microporous film that is made from polyvinylidene fluoride, polyethylene, polypropylene or polyethersulfone and treated to be water repellent, may be used to configure the gas-liquid separating part.

In the hydrogen producing apparatus in the present embodiment, the hydrogen-generating-material containing vessel 1 and the water containing vessel 2 are connected to the main body portion of the hydrogen producing apparatus in a detachable manner via the detachable portions 3. As described above, in the hydrogen producing apparatus in the present embodiment, the hydrogen-generating-material containing vessel 1 and/or the water containing vessel 2 is preferably attached to the main body portion of the hydrogen producing apparatus in a detachable manner. Here, the above-noted main body portion refers to a portion in the hydrogen producing apparatus other than the hydrogen-generating-material containing vessel 1 and the water containing vessel 2 (including the heat insulator 4, the pump 5, pipes located above the detachable portions 3 in FIG. 1 and the gas-liquid separating part 7).

When hydrogen is generated by the reaction between the hydrogen generating material 1*a* and the water 2*a* in the hydrogen-generating-material containing vessel 1, the hydrogen generating material 1*a* contained in the hydrogen-generating-material containing vessel 1 changes to a reaction product, whereas the water 2*a* contained in the water containing vessel 2 is consumed and decreases in amount. With the hydrogen producing apparatus having the hydrogen-generating-material containing vessel 1 and/or the water containing vessel 2 that are detachable as described above, when the reaction of the hydrogen generating material 1*a* in the hydrogen-generating-material containing vessel 1 proceeds and reaches the state in which hydrogen is no longer generated, the hydrogen-generating-material containing vessel 1 and the water containing vessel 2 are removed from the detachable portions 3, and a new hydrogen-generating-material containing vessel 1 that contains a hydrogen generating material and a new water containing vessel 2 that contains water 2*a* are attached to the main body portion via the detachable portions 3, thereby allowing a repeated hydrogen generation. Therefore, by preparing a standby hydrogen-generating-material containing vessel or a standby water containing vessel, the hydrogen producing apparatus can produce hydrogen continuously, even at a place where it is difficult to obtain a hydrogen generating material or water and a place where it is difficult to supply a hydrogen generating material or water to the apparatus. Accordingly, portability of the apparatus is improved.

An integrated vessel may be formed by combination of the hydrogen-generating-material containing vessel 1 and the water containing vessel 2. The integrated vessel is preferably attachable to and detachable from the main body portion of the hydrogen producing apparatus because the vessel is easily replaced.

There is no particular limitation on the structure of the detachable portions 3. For example, it is possible to adopt a structure in which parts that are formed in a tubular shape (e.g., pipes) are provided on the side of the main body portion of the hydrogen producing apparatus, respective pipes of the hydrogen-generating-material containing vessel 1 and the water containing vessel 2 (the hydrogen outflow pipe 1*b*, the water supply pipes 1*c* and 2*b*, etc.) are inserted into those parts, and the connection portions (portions where the pipes are inserted) are sealed using a packing such as a rubber ring so as to prevent leakages of hydrogen and water.

Moreover, the hydrogen producing apparatus of the present embodiment preferably includes the cooling portion 6 for cooling the mixture of water and hydrogen discharged from the hydrogen-generating-material containing vessel 1. In the above-described hydrogen producing apparatus, since the temperature inside the hydrogen-generating-material containing vessel 1 may become close to the boiling point of water, part of the water discharged as the mixture with the hydrogen is water vapor. Accordingly, providing the cooling portion 6 raises the water collection rate in the gas-liquid separating part 7 because the water vapor in the mixture described above is cooled to turn into liquid water. Therefore, the cooling portion 6 is preferably disposed between the hydrogen-generating-material containing vessel 1 and the gas-liquid separating part 7. The cooling portion 6 may be, for example, a cooling portion with a structure in which a metallic cooling fin is arranged so as to be in contact with the pipe. Further, an air-cooling fan may be used.

As shown in FIG. 1, the heat insulator 4 is preferably disposed in at least part of an outer periphery of the hydrogen-generating-material containing vessel 1. By disposing the heat insulator 4 as described above, the release of heat in the hydrogen-generating-material containing vessel 1 to the outside is prevented. Accordingly, the hydrogen generation can be stabilized. In the hydrogen producing apparatus, the hydrogen generating material is heated and reacts with water so as to generate hydrogen. However, even when the hydrogen generating material is heated, if the heat is released to the outside of the hydrogen-generating-material containing vessel 1 through an outer wall, the temperature of the hydrogen generating material does not rise, so that the efficiency of hydrogen generating reaction may decline, the hydrogen generating reaction may cease, or no hydrogen may be generated. In contrast, by disposing the heat insulator 4 as described above, the release of heat in the hydrogen-generating-material containing vessel 1 to the outside is suppressed.

Especially when the hydrogen-generating-material containing vessel 1 and the water containing vessel 2 are adjacent to each other in the hydrogen producing apparatus, it is more preferable that the heat insulator 4 is disposed at least such that the hydrogen-generating-material containing vessel 1 and the water containing vessel 2 are adjacent to each other via the heat insulator 4.

In the case where the hydrogen-generating-material containing vessel 1 and the water containing vessel 2 are adjacent to and in contact with each other, the heat in the hydrogen-generating-material containing vessel 1 is easily conducted to the side of the water containing vessel 2, thus more prominently causing the above-described problem that a drop of the temperature in the hydrogen-generating-material containing vessel 1 causes the hydrogen generating reaction to become less efficient or to cease. If the hydrogen-generating-material containing vessel 1 and the water containing vessel 2 are made adjacent to each other with no heat insulator 4 interposed therebetween, the heat released from the hydrogen-generating-material containing vessel 1 may raise the temperature of water in the water containing vessel 2, causing the density of water to decrease, resulting in a decrease in the weight of the water to be supplied by the pump 5. This may lower the hydrogen generating rate. Such a problem can be avoided by disposing the heat insulator 4 such that the hydrogen-generating-material containing vessel 1 and the water containing vessel 2 are adjacent to each other via the heat insulator 4. Particularly, the heat insulator 4 is preferably disposed on an entire outer periphery of the hydrogen-generating-material containing vessel 1.

The material of the heat insulator 4 preferably is a porous heat insulator such as Styrofoam or polyurethane foam, or a heat insulator having a vacuum insulation structure, for example.

Figure 2:
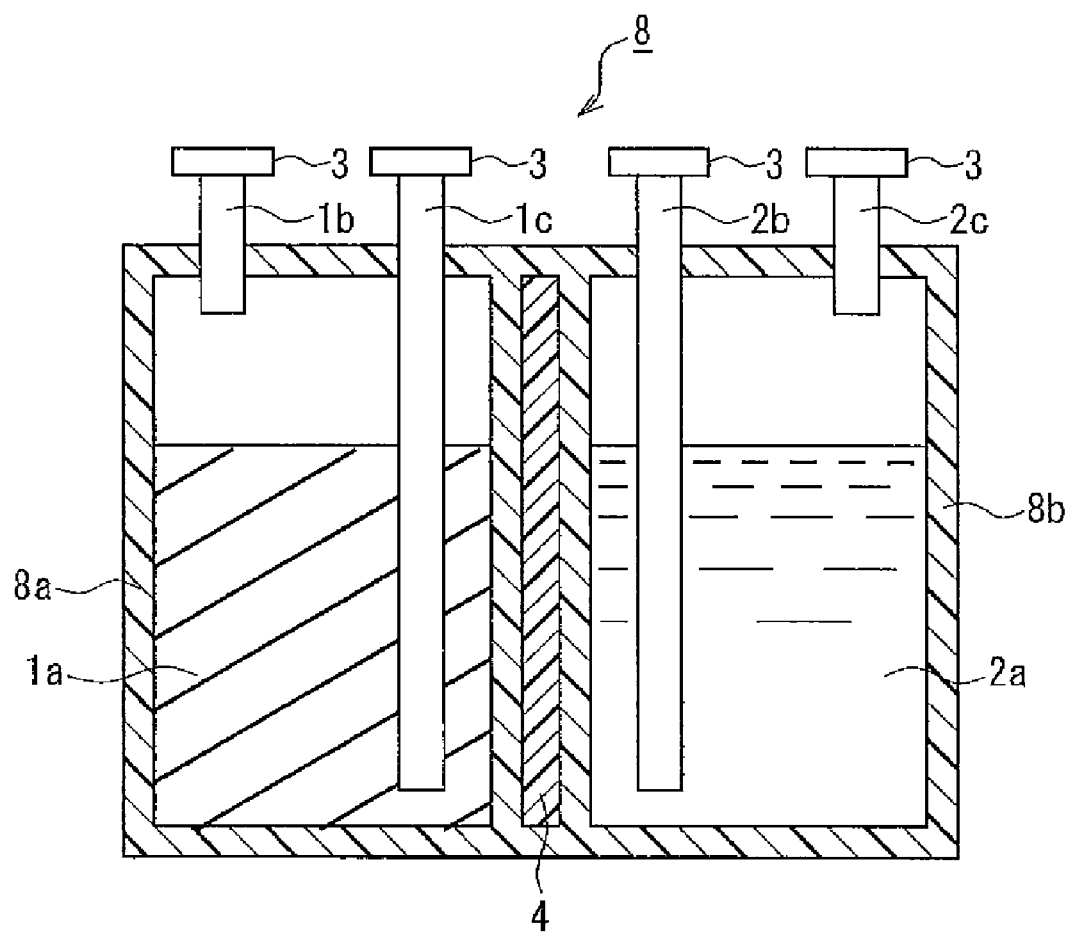
FIG. 2 is a partially cross-sectional schematic view showing an integrated vessel obtained by making a hydrogen-generating-material containing vessel and a water containing vessel as one piece.

FIG. 2 is a partially cross-sectional schematic view showing an integrated vessel 8 obtained by making a hydrogen-generating-material containing vessel 8*a* and a water containing vessel 8*b* as one piece. In FIG. 2, other than the integrated vessel 8, portions similar to those in FIG. 1 are assigned the same reference numerals, and the description thereof will be omitted. Since the integrated vessel 8 is obtained by making the hydrogen-generating-material containing vessel 8*a* and the water containing vessel 8*b* as one piece, it can be replaced more easily.

Further, also in the above-described integrated vessel 8, the heat insulator 4 is preferably disposed between the hydrogen-generating-material containing vessel 8a and the water containing vessel 8b. In this case, it is also possible to avoid the above-described problem that may be caused in the case where the hydrogen-generating-material containing vessel 8a and the water containing vessel 8b are adjacent to each other.

The hydrogen generating material that can be used in the hydrogen producing apparatus of the present embodiment is not particularly limited as long as it is a material that reacts with water so as to generate hydrogen. However, metals such as aluminum, silicon, zinc and magnesium, and alloys mainly containing at least one metallic element of aluminum, silicon, zinc and magnesium are preferably used. In the case of using the alloys mentioned above, there is no particular limitation on elements other than the above-noted metallic elements that are mainly contained. Here, the phrase "mainly containing" means containing at least 80% by mass and more preferably at least 90% by mass of the element with respect to the overall alloy. Only one of the metals and alloys listed above may be used as the hydrogen generating material, or two or more of them may be used in combination. These hydrogen generating materials do not react with water easily at room temperature but, when heated, more easily react with water exothermically. The room temperature referred to in the instant description is a temperature ranging from 20° C. to 30° C.

Here, in the case of using aluminum as the hydrogen generating material, for example, the reaction between aluminum and water is considered to proceed by any of the formulae (1) to (3) below. The calorific value generated by the formula (1) below is 419 kJ/mol.

$$2Al + 6H_2O \rightarrow Al_2O_3 \cdot 3H_2O + 3H_2 \quad (1)$$

$$2Al + 4H_2O \rightarrow Al_2O_3 \cdot H_2O + 3H_2 \quad (2)$$

$$2Al + 3H_2O \rightarrow Al_2O_3 + 3H_2 \quad (3)$$

The size of the above-described hydrogen generating material is not particularly limited, but the mean particle diameter thereof is preferably from 0.1 μm to 100 μm, more preferably, to 50 μm, for example. In general, the above-described hydrogen generating material has a surface on which a stable oxide film is formed. Accordingly, if the hydrogen generating material is in the form of a plate, block and bulk with a particle diameter of 1 mm or larger, the reaction with water does not proceed even when the hydrogen generating material is heated, and substantially no hydrogen is generated in some cases. In contrast, setting the above-described hydrogen generating material to have a mean particle diameter of not larger than 100 μm reduces the effect of inhibiting reaction with water exerted by the oxide film. Accordingly, although the hydrogen generating material does not react with water easily at room temperature, it is more likely to react with water when heated, so that the hydrogen generating reaction is sustained. When the hydrogen generating material is set to have a mean particle diameter of not larger than 50 μm, it can react with water even under a mild condition at about 40° C. so as to generate hydrogen. On the other hand, if the mean particle diameter of the hydrogen generating material is set to be smaller than 0.1 μm, the ignitability thereof increases, resulting in difficult handling, or the filling density thereof decreases, leading to a lower energy density. Consequently, the mean particle diameter of the above-described hydrogen generating material is preferably in the range noted above.

The mean particle diameter referred to in the instant description means the value of the diameter of particles with an accumulated volume percentage of 50%. The mean particle diameter may be measured by, for example, a laser diffraction scattering method or the like. More specifically, it is a method of measuring a particle size distribution utilizing a scattering intensity distribution detected by irradiating an object to be measured dispersed in a liquid phase such as water with laser light. As a device for measuring the particle size distribution by the laser diffraction scattering method, "MICROTRAC HRA" manufactured by NIKKISO CO., LTD. is used, for example.

Further, the shape of the above-described hydrogen generating material may be, not particularly limited, particles or flakes whose mean particle diameter falls within the above-noted range, for example.

In order to start the reaction between the water and the hydrogen generating material easily, it is preferable to heat at least one of the hydrogen generating material and the water. However, as described earlier, when the water is heated in the water containing vessel 2, for example, the density of water may decrease with an increase in the temperature of the water, so that the weight of water to be supplied by the pump 5 may decrease, resulting in a lower rate of hydrogen generation. Thus, heating of only the hydrogen generating material, or heating of the water after passing through the pump 5, if the water is heated, is more preferable. The heating temperature is preferably from 40° C., more preferably, from 60° C. to 100° C. The temperature that can maintain the above-noted exothermic reaction between hydrogen generating material and water is usually equal to or higher than 40° C. Once the exothermic reaction starts and the hydrogen is generated, the internal pressure of the hydrogen-generating-material containing vessel sometimes rises so as to raise the boiling point of water, and the temperature inside the vessel sometimes reaches 120° C. However, in terms of the control of the hydrogen generating rate, the temperature inside the vessel is preferably equal to or lower than 100° C.

It is appropriate that the above-noted heating be carried out only at the time when the above-described exothermic reaction starts. The reason is that, once the exothermic reaction between water and hydrogen generating material starts, the heat generated by that reaction helps to sustain the reaction that follows. It may also be possible to carry out the heating and supply the water to the hydrogen-generating-material containing vessel at the same time.

Although the method of the heating is not particularly limited, the heating can be carried out by utilizing heat generated by passing an electric current through a resistor. For example, such a resistor is attached to an external portion of the hydrogen-generating-material containing vessel and allowed to generate heat, and the vessel is heated externally, whereby it is possible to heat at least one of the hydrogen generating material and the water. The kind of the above-noted resistor is not particularly limited. For example, silicon carbide, a PTC thermistor and metallic heating elements such as a nichrome wire and a platinum wire can be used.

Further, the above-described heating can also be carried out by heat generated by a chemical reaction of a heat generating material. Such a heat generating material can be a material that reacts with water exothermically to form hydroxide or hydrate, a material that reacts with water exothermically to generate hydrogen, or the like. Examples of the above-noted material that reacts with water exothermically to form hydroxide or hydrate can include oxides of an alkali metal (lithium oxide and the like), oxides of an alkaline-earth metal (calcium oxide, magnesium oxide and the like), chlorides of an alkaline-earth metal (calcium chloride, magnesium chloride and the like) and sulfated compounds of an alkaline-earth metal (calcium sulfate and the like). Examples of the above-noted material that reacts with water exothermically to generate hydrogen can include alkali metals (lithium, sodium and the like) and metal hydrides (sodium borohydride, potassium borohydride, lithium hydride and the like). These materials can be used alone or in combination of two or more.

It is possible to place the above-described heat generating material together with the hydrogen generating material in the hydrogen-generating-material containing vessel and add water to them so as to cause an exothermic reaction between the water and the heat generating material, thereby directly heating the hydrogen generating material and the water inside this vessel. Further, it is also possible to place the above-described heat generating material outside the hydrogen-generating-material containing vessel and allow it to generate heat so as to heat the vessel externally, thereby heating at least one of the hydrogen generating material and the water.

As the heat generating material described above, also known is a material that reacts exothermically with a material other than water, for example, a material that reacts exothermically with oxygen such as iron powder. Since oxygen has to be introduced for the exothermic reaction, such a material is preferably placed outside the hydrogen-generating-material containing vessel rather than placed in the hydrogen-generating-material containing vessel.

In the case of placing the above-noted heat generating material together with the hydrogen generating material in the hydrogen-generating-material containing vessel and adding water to them for heating, the heat generating material may be used as a mixture prepared by mixing the heat generating material with the hydrogen generating material in such a manner as to be dispersed uniformly or nonuniformly. Further, the heat generating material is more preferably distributed unevenly in the hydrogen-generating-material containing vessel. Particularly preferably, the heat generating material is concentrated partially in the vicinity of a water supply portion (for example, in the vicinity A of an opening of the water supply pipe 1c in FIG. 1) inside the hydrogen-generating-material containing vessel. By concentrating the heat generating material inside the hydrogen-generating-material containing vessel in this way, it is possible to shorten the time from the start of water supply until the hydrogen generating material is heated, thus allowing a prompt hydrogen production.

The material and shape of the hydrogen-generating-material containing vessel are not particularly limited as long as the hydrogen-generating-material containing vessel can hold the hydrogen generating material that reacts with water exothermically to generate hydrogen. However, it is preferable to employ the material and shape that do not cause leakages of water and hydrogen from the hydrogen outflow pipe and the water supply pipe. More specifically, the vessel is preferably formed of a material that is not easily permeable to water or hydrogen and does not lead to the breakage of the vessel even when heated up to about 100° C. For example, it is possible to use metals such as aluminum and iron, and resins such as polyethylene (PE) and polypropylene (PP). Further, the vessel can have a prismatic shape, a columnar shape or the like.

The reaction product generated by the reaction between the hydrogen generating material and the water usually has a larger volume than the hydrogen generating material. Accordingly, in order to prevent the hydrogen-generating-material containing vessel from breaking at the time of such volume expansion accompanying the generation of the reaction product, the hydrogen-generating-material containing vessel is preferably deformable according to the reaction between the hydrogen generating material and the water. Considering this, among the materials listed above, the resins such as PE and PP are more preferable for the material of the hydrogen-generating-material containing vessel.

The hydrogen-generating-material containing vessel is provided with a hydrogen outflow portion for leading out hydrogen. There is no particular limitation on the structure of the hydrogen outflow portion. For example, the hydrogen outflow portion may be the hydrogen outflow pipe 1b as shown in FIG. 1 or a hydrogen outflow port, etc. Furthermore, the hydrogen outflow pipe and the hydrogen outflow port, etc. are preferably provided with a filter for confining the hydrogen generating material in the vessel. This filter is not particularly limited as long as it has a property of being permeable to gas and not easily permeable to liquid and solid, and can be, for example, a non-woven fabric made from PP.

The water containing vessel is not particularly limited, either, and can be, for example, a tank containing water similar to the one used in the conventional hydrogen producing apparatus. In the case where the hydrogen-generating-material containing vessel is deformable according to the volume expansion accompanying the generation of the reaction product from the hydrogen generating material and the water, the water containing vessel is also preferably deformable according to the reaction between the hydrogen generating material and the water. In this way, especially when the hydrogen-generating-material containing vessel and the water containing vessel are adjacent to each other or they are formed as one piece, the water containing vessel can be deformed with the hydrogen-generating-material containing vessel, so that the breakage of the water containing vessel can be prevented. Thus, in this case, the water containing vessel is preferably formed of a deformable material, for example, resins such as PE and PP.

In the case of adopting the above-described tank as the water containing vessel, it is necessary to use a pump (for example, the pump 5 in FIG. 1) for supplying water from the water containing vessel to the hydrogen-generating-material containing vessel.

The hydrogen producing apparatus in the present embodiment may include a gas-liquid separating film 7e, a flow rate adjusting portion 9 and a pressure relief valve 11 that are used in Embodiment 2 described later (see FIG. 3), and it may also include a trapping portion 12 that is used in Embodiment 3 described later (see FIG. 4).

In accordance with the above-described hydrogen producing apparatus of the present embodiment, the actual amount of generated hydrogen with respect to the theoretical amount of generated hydrogen assuming that all the hydrogen generating material has reacted (in the case of aluminum, the theoretical amount of generated hydrogen per gram is about 1360 ml at 25° C.) is, for example, at least about 50% and more preferably at least 70%, though depending on the conditions. This shows that hydrogen can be generated efficiently.

Embodiment 2

Figure 3:
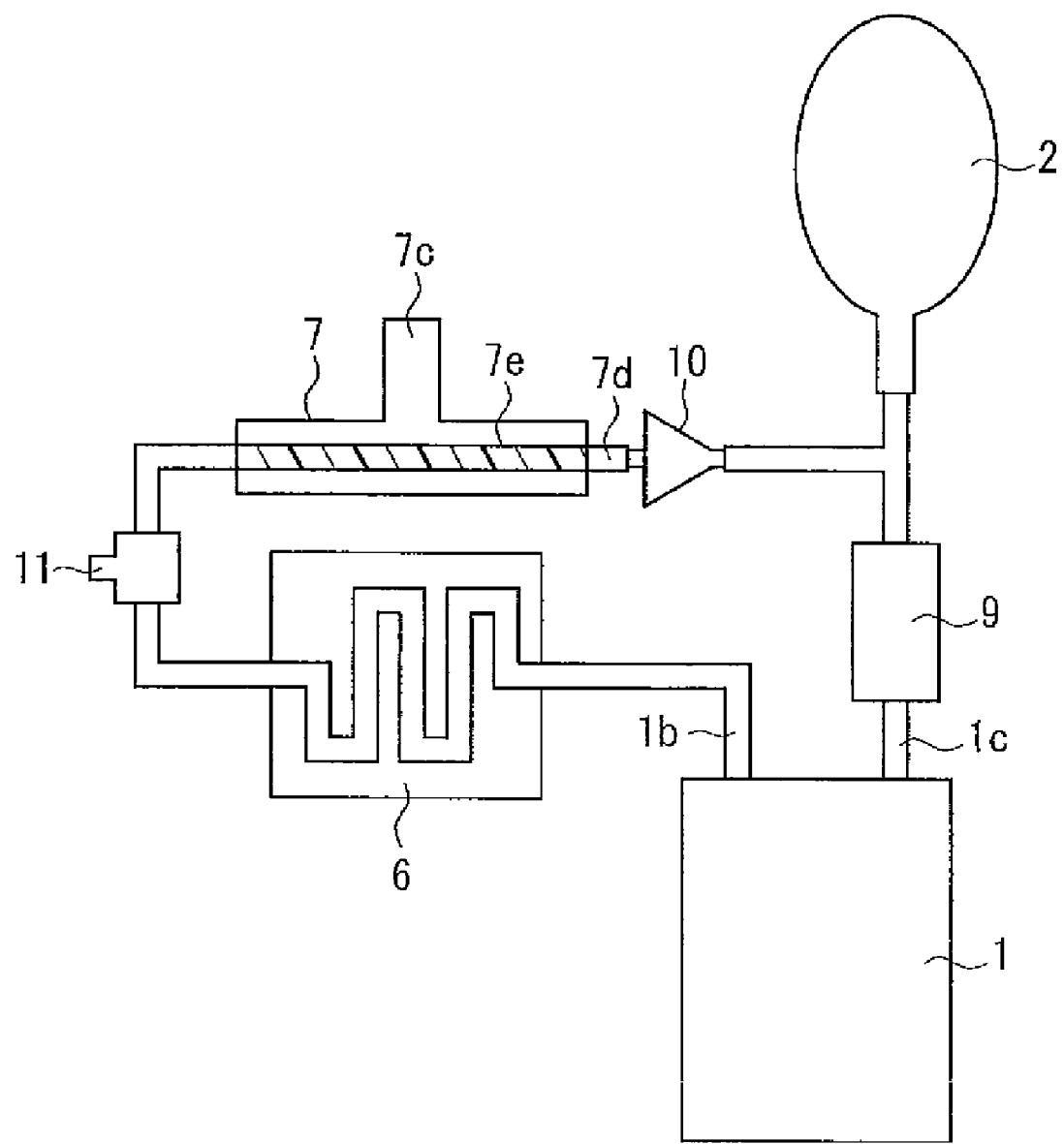
FIG. 3 is a partially cross-sectional schematic view showing another example of the hydrogen producing apparatus according to the present invention.

FIG. 3 is a partially cross-sectional schematic view showing another example of the hydrogen producing apparatus according to the present invention. In FIG. 3, portions similar to those in FIG. 1 in Embodiment 1 are assigned the same reference numerals, and the detailed description thereof will be omitted. In FIG. 3, numeral 1 denotes the hydrogen-generating-material containing vessel, numeral 1c denotes the water supply pipe, and numeral 1b denotes the hydrogen outflow pipe. Numeral 2 denotes the water containing vessel, numeral 6 denotes the cooling portion, and numeral 7 denotes the gas-liquid separating part. Further, numeral 9 denotes the flow rate adjusting portion for adjusting the water supply amount, numeral 10 denotes a check valve, and numeral 11 denotes the pressure relief valve. The gas-liquid separating part 7 is provided with the gas-liquid separating film 7e and further with a hydrogen outflow port 7c for discharging hydrogen that has passed through the gas-liquid separating film 7e. FIG. 3 shows the cross-section of only the gas-liquid separating part 7.

Since water and hydrogen are separated by the gas-liquid separating film 7e in the gas-liquid separating part 7, the movement amount of water inside the apparatus, the degree of the hydrogen generating reaction, etc. do not need to be controlled minutely from the viewpoint of the separation of water and hydrogen. Thus, a collecting operation of returning unreacted water to the water containing vessel 2 is carried out simply and efficiently.

The gas-liquid separating film 7e provided in the gas-liquid separating part 7 is not particularly limited as long as it is permeable to only one of water and hydrogen in the mixture of the water and the hydrogen and is not permeable to the other. For example, a polytetrafluoroethylene microporous film or a microporous film that is made from polyvinylidene fluoride, polyethylene, polypropylene or polyethersulfone and treated to be water repellent may be used.

The water can be supplied from the water containing vessel 2 to the hydrogen-generating-material containing vessel 1 by allowing the water containing vessel 2 to contract by elasticity of an elastic material. The use of the elasticity of the elastic material eliminates the need for a supplying device that requires the power of a pump or the like, so that the energy necessary for generating hydrogen can be suppressed, resulting in a hydrogen producing apparatus with a further enhanced energy efficiency.

The elastic material used for supplying water is not particularly limited and can be, for example, a material having an elasticity such as rubber, a helical spring or a spiral spring.

A mechanism of supplying water by the elasticity of the elastic material can be in various forms according to the elastic material to be used, without any particular limitation. For example, as shown in FIG. 3, a balloon-like vessel made of rubber (a so-called rubber balloon) is used as the water containing vessel 2 and swelled by pouring water therein, so that the force that this vessel is deflated by the elasticity of the rubber forming this balloon-like vessel can be used as a pressure for supplying water. Also, the water containing vessel may be formed of an easily deformable material, and a contracted helical spring as the elastic material may be placed on an outer side of this vessel, so that water can be supplied by deforming the vessel by the elasticity (restoring force) of this helical spring. Further, it may be possible to replace an electric motor by a tube pump having a spiral spring as a power source.

The check valve 10 is preferably disposed in a pipe connecting the gas-liquid separating part 7 and the water containing vessel 2. By providing the check valve 10, the backflow of water through the above-noted pipe to the hydrogen-generating-material containing vessel 1 is prevented. Also, providing the check valve 10 eliminates the need to dispose another pump for collecting the water separated in the gas-liquid separating part 7 to the water containing vessel 2, thus allowing a non-powered collection.

Further, the hydrogen producing apparatus in the present embodiment preferably includes the pressure relief valve 11. Even in the case where an increase in the hydrogen generating rate raises the internal pressure of the hydrogen producing apparatus, this makes it possible to discharge hydrogen through pressure relief valve 11 to the outside of the apparatus, thereby preventing the apparatus from being damaged by a rupture or the like. Although the pressure relief valve 11 is disposed in the pipe connecting the cooling portion 6 and the gas-liquid separating part 7 in FIG. 3, the location is not limited to this. The pressure relief valve 11 can be disposed in any location as long as the hydrogen generated in the hydrogen-generating-material containing vessel 1 can be discharged. For example, in FIG. 3, the pressure relief valve 11 may be disposed in any location from the hydrogen outflow pipe 1b to the gas-liquid separating part 7.

The water supply pipe 1c for supplying water from the water containing vessel 2 to the hydrogen-generating-material containing vessel 1 is preferably provided with the flow rate adjusting portion 9 for adjusting the water supply amount. Even when the water is supplied from the water containing vessel 2 to the hydrogen-generating-material containing vessel 1 and the reaction between the hydrogen generating material and the water begins, the reaction efficiency sometimes decreases, for example, if the water supply amount is too large. However, by providing the flow rate adjusting portion 9, the amount of water supplied to the hydrogen-generating-material containing vessel 1 can be controlled, thereby suppressing the above-described decrease in the reaction efficiency. Further, by providing the flow rate adjusting portion 9, the water can be supplied from the water containing vessel 2 to the hydrogen-generating-material containing vessel 1 not only continuously but also intermittently, so that it becomes possible to stop supplying the water to the hydrogen-generating-material containing vessel 1 so as to stop the generation of hydrogen even when the water is contained in the water containing vessel 2, for example.

The structure of the flow rate adjusting portion 9 is not particularly limited and can be, for example, a valve, a throttle formed by reducing the pipe diameter, or the like.

The hydrogen producing apparatus in the present embodiment may include a trapping portion 12 that is used in Embodiment 3 described later (see FIG. 4).

Embodiment 3

FIG. 4 is a partially cross-sectional schematic view showing an example of a fuel cell system according to the present invention. In FIG. 4, the fuel cell system in the present embodiment includes a fuel cell 100 and a hydrogen producing apparatus 200. The hydrogen producing apparatus 200 can be the hydrogen producing apparatus in Embodiment 1 or Embodiment 2. In FIG. 4, portions similar to those in FIG. 1 in Embodiment 1 are assigned the same reference numerals, and the detailed description thereof will be omitted. Further, FIG. 4 shows the cross-sections of only the hydrogen-generating-material containing vessel 1, the water containing vessel 2, the gas-liquid separating part 7 and the fuel cell 100.

In FIG. 4, numeral 1 denotes the hydrogen-generating-material containing vessel, numerals 1c and 2b denote the water supply pipes, and numeral 1b denotes the hydrogen outflow pipe. Numeral 2 denotes the water containing vessel, numeral 2a denotes the water, and numeral 2c denotes the water collecting pipe. Further, numeral 5 denotes the pump, numeral 7 denotes the gas-liquid separating part, and numeral 12 denotes the trapping portion. The fuel cell 100 and the hydrogen producing apparatus 200 are connected by the hydrogen outflow pipe 7c.

The fuel cell 100 includes a membrane electrode assembly (MEA) 101 including a positive electrode 110 that reduces oxygen, a negative electrode 120 that oxidizes hydrogen and a solid electrolyte membrane 130 disposed between the positive electrode 110 and the negative electrode 120. Also, on both sides of the MEA 101, a positive electrode collector plate 140 and a negative electrode collector plate 150 are disposed. An end portion of the positive electrode collector plate 140 is connected with a positive electrode lead 160, and an end portion of the negative electrode collector plate 150 is connected with a negative electrode lead 170. Also, a lateral surface of the fuel cell 100 is sealed with a sealing material 180. Additionally, the positive electrode collector plate 140 is provided with air holes 140a, through which oxygen in the air is supplied to the positive electrode 110. On the other hand, the negative electrode collector plate 150 is provided with hydrogen inflow holes 150a through which hydrogen introduced from the hydrogen outflow pipe 7c is supplied to the negative electrode 120. Individual members used in the fuel cell 100 are not particularly limited as long as they can be generally used in a fuel cell.

The hydrogen producing apparatus 200 may be provided with the cooling portions 6 used in Embodiments 1 and 2 (see FIGS. 1 and 3). Also, in the case where a polymer electrolyte fuel cell is used as the fuel cell 100 and the cooling portion is provided further, it is preferable that the temperature at which the mixture of water and hydrogen is cooled down in the cooling portion is equal to or higher than the temperature at which the fuel cell 100 is operated in a regular state. In the polymer electrolyte fuel cell, the conductivity of the solid polymer in the electrolyte drops when the solid polymer is dried. Thus, hydrogen serving as the fuel and the air are generally humidified and supplied. Accordingly, in the hydrogen producing apparatus 200, it is preferable that the temperature at which the mixture is cooled down in the cooling portion is set to the vicinity of an operating temperature of the fuel cell, because cooling down the mixture of hydrogen and water discharged from the hydrogen-generating-material containing vessel 1 to a low temperature in the cooling portion results in a decrease in the humidity of hydrogen.

The water component (water vapor containing by-products, etc.) in the mixture that has not been condensed in the above-described cooling portion and thus has not been separated in the gas-liquid separating part 7 is discharged to the hydrogen outflow pipe 7c together with hydrogen. The trapping portion 12 for trapping the by-products is disposed in the hydrogen outflow pipe 7c.

The trapping portion 12 can be, for example, a tubular main body vessel or the like filled with a trapping material capable of trapping the by-products. The trapping material mentioned above can be, for example, an ion exchange resin. When the mixture of hydrogen and water containing by-products is introduced into the trapping portion 12 having the ion exchange resin, the by-products are substituted by $H^+$ or $OH^-$ in the ion exchange resin, so that the by-products are physically trapped by the ion exchange resin. As a result, the hydrogen from which the by-products causing the deterioration of the fuel cell are removed is supplied to the fuel cell. Accordingly, it is possible to prevent these by-products from substituting protons in a proton exchange resin and a proton exchange membrane included in the fuel cell, being adsorbed on a catalyst and being deposited in electrodes, so that the deterioration of the fuel cell can be suppressed.

Specific examples of the above-noted ion exchange resin can include "AMBERLITE" (trade name) manufactured by Rohm and Haas Company (US) and "Nafion" (registered trademark) manufactured by DuPont.

Further, as the material capable of trapping the by-products, a chelate resin can also be illustrated. Since the chelate resin is selective about ions that can be captured, it is appropriate to select a chelate resin or a chelate film suitable for trapping the ions that are expected to be generated. Similarly to the case of using the ion exchange resin, the by-products are physically trapped by the chelate resin. The use of the trapping portion having the chelate resin described above can also suppress the deterioration of the fuel cell.

For example, in the case where the hydrogen generating material is aluminum (Al), it is considered that $Al(OH)_3$ is mainly produced as a by-product in the hydrogen generating reaction. Thus, as the chelate resin capable of capturing Al ions, an iminodiacetate chelate resin or the like is effective, though there is no limitation to this.

Furthermore, as the material capable of trapping the by-products, it is also possible to use at least one material (adsorbent) of molecular sieves, silica gel, activated carbon, alumina and water absorptive polymer. Although these materials include materials having no ion adsorptivity, all of them have a water vapor adsorptive function and thus can trap the by-products together with water vapor. The use of the trapping material described above can also suppress the deterioration of the fuel cell.

The trapping portion 12 can also be made detachable. In this way, by replacing the trapping portion 12 with a new trapping portion 12 when a trapping function is lowered, it becomes possible to trap by-products again.

It is preferable that the gas-liquid separating part 7 and the trapping portion 12 are arranged such that the gas-liquid separating part 7 is closer to the hydrogen-generating-material containing vessel 1. By configuring the system so that the mixture containing hydrogen, etc. discharged from the hydrogen-generating-material containing vessel 1 is introduced to the gas-liquid separating part 7 before entering the trapping portion 12, most of the by-products in the above-noted mixture can be removed in the gas-liquid separating part 7. Consequently, the amount of the by-products entering the trapping portion 12 can be minimized, thus achieving a longer lifetime of the trapping material inside the trapping portion 12.

The hydrogen producing apparatus 200 in the present embodiment may include the gas-liquid separating film 7e, the flow rate adjusting portion 9 and the pressure relief valve 11 used in Embodiment 2 described above (see FIG. 3).

The fuel cell system according to the present embodiment is very useful because it includes the hydrogen producing apparatus using the hydrogen generating material that generates hydrogen in a simplified manner, and a fuel cell, and further includes the gas-liquid separating part and a trap for trapping by-products, thereby preventing a decrease in the ion conductivity, the catalyst function, the gas diffusion performance, etc. in the fuel cell, making it possible to suppress the deterioration of the fuel cell. Taking advantage of these characteristics, the fuel cell system in the present embodiment can be used preferably for various purposes in which a conventional fuel cell is applied.

Hereinafter, the present invention will be described in detail by way of examples. It should be noted that the following examples do not limit the present invention.

Example 1

Using the hydrogen producing apparatus shown in FIG. 1, hydrogen was produced as follows. As the hydrogen-generating-material containing vessel 1, a prismatic vessel that was made from PP and had an internal volume of 65 $cm^3$ was used. As the water supply pipe 1c and the hydrogen outflow pipe 1b, aluminum pipes having an internal diameter of 2 mm and an external diameter of 3 mm were used. The water containing vessel 2 also had the same structure as the hydrogen-generating-material containing vessel 1, and aluminum pipes that were the same as the water supply pipe 1c, etc. were also used as the water supply pipe 2b and the water collecting pipe 2c. The detachable portions 3 had a structure in which respective pipes of the hydrogen-generating-material containing vessel 1 and the water containing vessel 2 were inserted into tubular-formed parts with an internal diameter of 3.5 mm located on the side of the hydrogen producing apparatus. In each of the tubular parts, a rubber ring was disposed, thereby suppressing the leakage of hydrogen and water from the detachable portions 3. Further, the heat insulator 4 that was made of Styrofoam and had a thickness of 5 mm was disposed so as to surround the outer periphery of the hydrogen-generating-material containing vessel 1.

The cooling portion 6 was configured by arranging a 40 mm×50 mm×12 mm cooling fin made of aluminum and a stainless steel pipe with an external diameter of 3 mm, an internal diameter of 2 mm and a length of 200 mm in such a manner as to contact each other. One surface of the cooling fin was provided with 8 fins, each of which had a thickness of 1 mm, whereas the other surface was in contact with the above-noted pipe that was in a heavily winding state. The length from the detachable portion 3 with which the hydrogen outflow pipe 1b was connected to the gas-liquid separating part 7 was set to 350 mm.

First, 21 g of aluminum powder with a mean particle diameter of 6 μm as the hydrogen generating material and 3.5 g of calcium oxide as the heat generating material were placed in the hydrogen-generating-material containing vessel 1, and then the vessel 1 was sealed with a lid to which the hydrogen outflow pipe 1b and the water supply pipe 1c were attached. Then, 50 g of water was poured into the water containing vessel 2, and the hydrogen-generating-material containing vessel 1 and the water containing vessel 2 were connected to the detachable portions 3 as shown in FIG. 1.

Next, using the pump 5, water was supplied continuously from the water containing vessel 2 to the hydrogen-generating-material containing vessel 1 at a water volume of 1.1 g/min.

Figure 5:
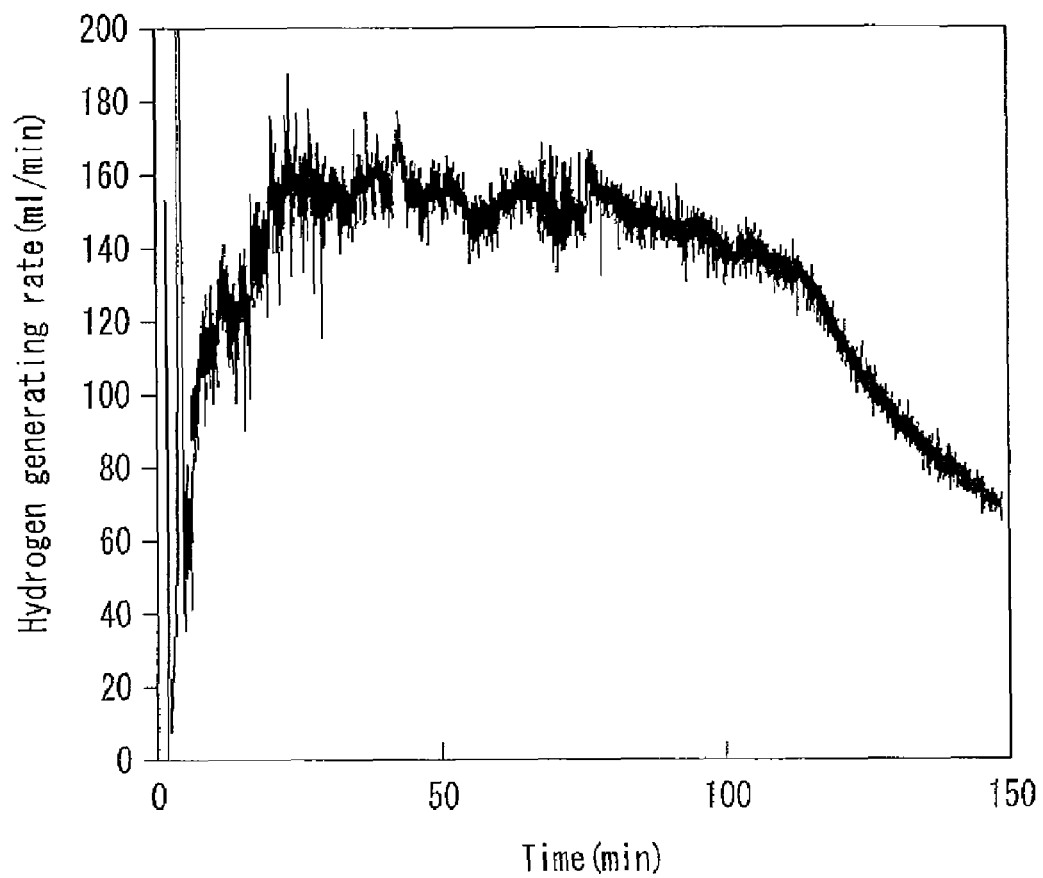
FIG. 5 shows the relationship between the hydrogen generating rate and the elapsed time in a hydrogen producing apparatus in Example 1.

FIG. 5 shows the relationship between a hydrogen generating rate and an elapsed time when hydrogen was generated by the above-described operation in the hydrogen producing apparatus in Example 1. FIG. 5 indicates the following. Hydrogen was generated immediately after the water was supplied, and the hydrogen generating rate and the surface temperature of the vessel 1 rose rapidly. After about 10 minutes, the hydrogen generating rate and the surface temperature of the vessel 1 plateaued, and the hydrogen was generated at a constant hydrogen generating rate of about 150 ml/min. The hydrogen producing apparatus in the present example generated 20000 ml of hydrogen until 150 minutes had elapsed, and the reaction ratio of aluminum fine particles, which were the hydrogen generating material, was 70%. Here, the reaction ratio of the aluminum fine particles refers to the ratio of an actual amount of generated hydrogen with respect to a theoretical amount of generated hydrogen for the aluminum fine particles that are used. Also, the amount of water consumed within 150 minutes was 40 g, and the reaction ratio of water was 72%. Here, the reaction ratio of the water refers to the ratio of a theoretically needed amount of water with respect to an actual amount of water that is used. The temperature of the mixture containing hydrogen and water at an inlet of the cooling portion 6 was about 90° C. and dropped to 70° C. near an outlet of the cooling portion 6.

Example 2

Hydrogen was produced similarly to Example 1 using a hydrogen producing apparatus with the same configuration as FIG. 1 except that no cooling portion 6 was disposed and the detachable portion 3 to which the hydrogen outflow pipe 1b was connected and the gas-liquid separating part 7 were connected by a silicone tube.

The hydrogen producing apparatus according to Example 2 generated hydrogen similarly to the apparatus of Example 1. However, since the apparatus of Example 2 was provided with no cooling portion, the mixture of hydrogen and water whose temperature remained high flowed into the gas-liquid separating part 7. Thus, the amount of water collected in the gas-liquid separating part 7 was reduced. The hydrogen producing apparatus in Example 2 generated 20000 ml of hydrogen until 150 minutes had elapsed, with the water consumption amount being 50 g and the reaction ratio of water being 60%.

Comparative Example 1

Hydrogen was produced similarly to Example 1 using a hydrogen producing apparatus with the same configuration as FIG. 1 except that no gas-liquid separating part 7 was disposed.

The hydrogen producing apparatus according to Comparative Example 1 also generated hydrogen similarly to Examples 1 and 2. However, since the apparatus of Comparative Example 1 was provided with no gas-liquid separating part, a large amount of unreacted water was discharged from the hydrogen outflow pipe 1b. Thus, the water containing vessel 2 was emptied of water at the time when 10200 ml of hydrogen was generated. In Comparative Example 1, the reaction ratio of water dropped to 30%.

Example 3

Using the hydrogen producing apparatus shown in FIG. 3, hydrogen was produced as follows. As the hydrogen-generating-material containing vessel 1, a prismatic vessel that was made from aluminum and had an internal volume of 9 cm$^3$ was used. As the water supply pipe 1c and the hydrogen outflow pipe 1b, aluminum pipes having an internal diameter of 2 mm and an external diameter of 3 mm were used. The gas-liquid separating part 7 was configured as illustrated in FIG. 3. Hydrogen in the mixture discharged from the hydrogen-generating-material containing vessel 1 passed through the gas-liquid separating film 7e and was discharged from the hydrogen outflow pipe 7c, whereas water separated in the gas-liquid separating film 7e passed through the check valve 10 and was collected into the water containing vessel 2. As the pressure relief valve 11, a valve with an opening pressure of 0.1 MPa was used. In the cooling portion 6, a stainless steel pipe with an internal diameter of 1 mm and a length of 20 cm in a heavily winding state was arranged in such a manner as to contact one surface of an aluminum cooling fin. Further, a polytetrafluoroethylene microporous film with an area of 5 cm$^2$ (manufactured by Japan Gore-Tex, Inc.) was used as the gas-liquid separating film 7e.

First, 4.4 g of aluminum powder with a mean particle diameter of 3 μm as the hydrogen generating material and 0.7 g of calcium oxide as the heat generating material were placed in the hydrogen-generating-material containing vessel 1, and then the vessel 1 was sealed with a lid to which the water supply pipe 1c and the hydrogen outflow pipe 1b were attached. A balloon made of rubber was used as the water containing vessel 2, 5 g of water was poured therein, and the water containing vessel 2 was connected to the flow rate adjusting portion 9 as shown in FIG. 3. As the flow rate adjusting portion 9, a tube with an internal diameter of 0.1 mm whose length was adjusted so as to achieve a water supply amount of 0.16 g/minute was used. The discharge pressure of water was 0.05 MPa.

Next, immediately after 1 ml of water was poured into the hydrogen-generating-material containing vessel 1, the water supply pipe 1c and the hydrogen outflow pipe 1b were connected to the flow rate adjusting portion 9 and the cooling portion 6 as shown in FIG. 3. Subsequently, water was supplied continuously from the water containing vessel 2 to the hydrogen-generating-material containing vessel 1 containing the hydrogen generating material.

By the above operation, the temperature inside the hydrogen-generating-material containing vessel 1 rose, whereby hydrogen was generated. Then, a constant amount of water was supplied continuously from the water containing vessel 2 by the elasticity of this vessel, thereby making it possible to generate hydrogen stably without using any power of a pump or the like.

Further, in the hydrogen producing apparatus in Example 3, the gas-liquid separating part 7, the check valve 10 and the cooling portion 6 were provided, thereby collecting unreacted water discharged from the hydrogen-generating-material containing vessel 1. The amount of hydrogen generated by the above-mentioned operation in the hydrogen producing apparatus in Example 3 was 2436 ml, the total amount of water supplied at this time was 4.4 g, and the reaction ratio of water was 81%.

Moreover, FIG. 6 shows the relationship of the hydrogen generating rate (Generating rate in FIG. 6), the surface temperature of the hydrogen-generating-material containing vessel 1 (Vessel surface temperature in FIG. 6) and the internal pressure of the hydrogen-generating-material containing vessel 1 (Internal pressure in FIG. 6) with respect to an elapsed time when hydrogen was produced by the above-described operation in the hydrogen producing apparatus in Example 3. FIG. 6 indicates the following. In the hydrogen producing apparatus according to Example 3, hydrogen was generated immediately after water was supplied, and the hydrogen generating rate and the surface temperature of the vessel 1 rose rapidly. After about 5 minutes, the hydrogen generating rate and the surface temperature of the vessel 1 plateaued. Thereafter, the hydrogen was generated continuously for over 100 minutes in a stable manner without the need for any power of a pump or the like. When water flowed into the gas-liquid separating part 7, the internal pressure of the vessel 1 rose temporarily. This is considered to be because, since the water came into contact with the gas-liquid separating film 7e, the gas permeation area decreased, so that the internal pressure of the vessel 1 rose. When the water was separated from hydrogen and collected from the gas-liquid separating part 7 to the water containing vessel 2 and the gas-liquid separating part 7 was emptied of water, the internal pressure of the vessel 1 lowered again. From the above, it was understood that the hydrogen producing apparatus in Example 3 made it possible to collect unreacted water without the need for any power of a pump or the like, thereby generating hydrogen efficiently.

Comparative Example 2

Hydrogen was produced similarly to Example 3 except that no water collecting portion including the cooling portion 6, the gas-liquid separating part 7, etc. was disposed and the amount of water to be poured into the water containing vessel 2 was set to 25 g.

By the above operation, the temperature inside the hydrogen-generating-material containing vessel 1 rose, whereby hydrogen was generated. Then, a constant amount of water was supplied continuously from the water containing vessel 2 by the elasticity of this vessel, thereby making it possible to generate hydrogen stably without using any power of a pump or the like. However, the amount of hydrogen generated by the above-mentioned operation was 3481 ml, the total amount of water supplied at this time was 20 g, and the reaction ratio of water was 26%.

The hydrogen producing apparatus according to Comparative Example 2 also generated hydrogen similarly to Example 3. However, since the apparatus of Comparative Example 2 was provided with no water collecting portion, the reaction ratio of water dropped to 26%.

Example 4

Electric power was generated using the fuel cell system having the configuration shown in FIG. 4. The MEA 101 was confined by the sealing material 180 for suppressing gas leakage, the positive electrode collector plate 140 and the negative electrode collector plate 150, thus forming the fuel cell 100.

For the positive electrode 110 and the negative electrode 120 in the MEA 101, electrodes obtained by applying Pt supporting carbon to a carbon cloth ["LT 140E-W" (trade name) manufactured by E-TEK; Pt amount: 0.5 mg/cm$^2$] were used. Further, for the solid electrolyte membrane 130, "Nafion 112" (trade name) manufactured by DuPont. was used. The electrode area was set to 10 cm$^2$. A silicone rubber was used as the sealing material 180. As the positive electrode collector plate 140, the negative electrode collector plate 150, the positive electrode lead 160 and the negative electrode lead 170, stainless steel (SUS 304) plated with gold was used.

As the hydrogen-generating-material containing vessel 1, a prismatic vessel that was made from polypropylene and had an internal volume of 5 cm$^3$ was used. As the water supply pipe 1c and the hydrogen outflow pipes 1b and 7c, polypropylene pipes having an internal diameter of 2 mm and an external diameter of 3 mm were used. In the hydrogen-generating-material containing vessel 1, 2.2 g of aluminum powder with a mean particle diameter of 3 μm as the hydrogen generating material and 0.3 g of calcium oxide as the heat generating material were placed. As the water containing vessel 2, a prismatic vessel that was made from polypropylene and had an internal volume of 10 cm$^3$ was used, and 7 g of water was poured therein.

As the gas-liquid separating part 7, a prismatic vessel that was made from polypropylene and had an internal volume of 5 cm$^3$ was used. Further, 0.1 g of a hydrogen-ion-containing ion exchange resin ["AMBERLITE 1006F H" (trade name) manufactured by Rohm and Haas Company] as a trapping material for by-products was placed inside the trapping portion 12 for by-products.

Hydrogen was generated by supplying the water in the water containing vessel 2 to the hydrogen-generating-material containing vessel 1 using the pump 5, and a power generation test of the fuel cell 100 was conducted at a constant voltage of 0.6 V for 2 hours. After this power generation test, the individual vessels were filled again with a new hydrogen generating material and new water in the same amounts as above, thus conducting the power generation test again under a similar condition. This power generation test was repeated 50 times.

Example 5

The power generation test was conducted similarly to Example 4 except that, instead of the ion exchange resin "AMBERLITE 1006F H," 0.1 g of chelate resin ["AMBERLITE IRC748" (trade name) manufactured by Rohm and Haas Company] was used as the trapping material.

Example 6

The power generation test was conducted similarly to Example 4 except that, instead of the ion exchange resin "AMBERLITE 1006F H," 0.1 g of Molecular Sieves 5A (manufactured by Nacalai Tesque, Inc.) was used as the trapping material.

Example 7

The power generation test was conducted similarly to Example 4 except that the aluminum powder as the hydrogen generating material was replaced by 2.5 g of $NaBH_4$ powder and the water in the water containing vessel 2 was replaced by 7 g of 1 mol hydrochloric acid.

Example 8

The power generation test was conducted similarly to Example 5 except that the aluminum powder as the hydrogen generating material was replaced by 2.5 g of $NaBH_4$ powder and the water in the water containing vessel 2 was replaced by 7 g of 1 mol hydrochloric acid.

Example 9

The power generation test was conducted similarly to Example 6 except that the aluminum powder as the hydrogen generating material was replaced by 2.5 g of $NaBH_4$ powder and the water in the water containing vessel 2 was replaced by 7 g of 1 mol hydrochloric acid.

Reference Example 1

The power generation test was conducted similarly to Example 4 except that no trapping material was placed in the trapping portion 12.

Reference Example 2

The power generation test was conducted similarly to Example 7 except that no trapping material was placed in the trapping portion 12.

Comparative Example 3

The power generation test was conducted similarly to Example 4 except that no gas-liquid separating part 7 was provided in the hydrogen producing apparatus 200.

Comparative Example 4

The power generation test was conducted similarly to Example 7 except that no gas-liquid separating part 7 was provided in the hydrogen producing apparatus 200.

With respect to Examples 4 to 9, Reference Examples 1 and 2 and Comparative Examples 3 and 4 described above, the fuel cell power retention ratio after 10 times of power generation and that after 50 times of power generation were evaluated. The fuel cell power retention ratio after 10 times of power generation and that after 50 times of power generation were obtained respectively by dividing the outputs of the fuel cell after the tenth power generation test and the fiftieth power generation test by the output after the first power generation test and expressing the quotients on a percentage basis. Table 1 shows the results.

TABLE 1

|  | Fuel cell power retention ratio (%) | |
| --- | --- | --- |
|  | After 10 times of power generation | After 50 times of power generation |
| Example 4 | 99 | 98 |
| Example 5 | 98 | 98 |
| Example 6 | 98 | 97 |
| Example 7 | 99 | 97 |
| Example 8 | 98 | 97 |
| Example 9 | 98 | 98 |
| Reference Example 1 | 82 | 60 |
| Reference Example 2 | 80 | 62 |
| Comparative Example 3 | 98 | 45 |
| Comparative Example 4 | 97 | 48 |

All of Examples 4 to 9 achieved a fuel cell power retention ratio after 50 times of power generation of equal to or higher than 97%, indicating that it was possible to suppress the deterioration of the fuel cell over a long period of time by providing the gas-liquid separating part 7 and the trapping portion 12. On the other hand, in the systems of Reference Examples 1 and 2, the respective fuel cell power retention ratios after 10 times of power generation were 82% and 80%, and the respective fuel cell power retention ratios after 50 times of power generation were 60% and 62%, showing a continuous drop. This is considered to be because, in Reference Examples 1 and 2, among the by-products generated along with the hydrogen generating reaction, only the by-products contained in condensed water droplets were separated in the gas-liquid separating part 7, and the by-products contained in water vapor were sent to the fuel cell together with hydrogen, so that protons in a proton exchange resin and a proton exchange membrane included in the fuel cell were substituted, adsorbed on the catalyst and deposited in the electrodes, thus lowering the ion conductivity, catalyst function, gas diffusion performance, etc.

Further, Comparative Examples 3 to 4 maintained high fuel cell power retention ratios after 10 times of power generation of 98% and 97%, respectively. However, the fuel cell power retention ratios after 50 times of power generation dropped considerably to 45% and 48%, respectively. This is considered to be because Comparative Examples 3 to 4 had no gas-liquid separating part 7 and therefore had to trap a large amount of the by-products in the trapping portion 12, and they were able to trap and remove the by-products sufficiently until the tenth power generation but was no longer able to remove them with further more times of power generation, so that the by-products that entered the fuel cell caused the deterioration of the fuel cell.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

Industrial Applicability

As described above, the hydrogen producing apparatus according to the present invention can produce hydrogen simply and efficiently and can be utilized widely as a fuel source for a fuel cell, in particular, a fuel cell for small portable equipment or the like.

The invention claimed is:

1. A hydrogen producing apparatus comprising:
   a hydrogen-generating-material containing vessel for containing a hydrogen generating material;
   a water containing vessel for containing water;
   a water supply portion for supplying liquid water from the water containing vessel to the hydrogen-generating-material containing vessel;
   a hydrogen outflow portion for leading out hydrogen from the hydrogen-generating-material containing vessel;
   a gas-liquid separating part for separating liquid water and hydrogen containing water vapor from a mixture of hydrogen and water discharged from the hydrogen-generating-material containing vessel; and
   a water collecting portion for collecting the liquid water separated by the gas-liquid separating part into the water containing vessel.

2. The hydrogen producing apparatus according to claim 1, further comprising a cooling portion for cooling down the mixture of hydrogen and water discharged from the hydrogen-generating-material containing vessel before the mixture enters the gas-liquid separating part.

3. The hydrogen producing apparatus according, to claim 1, wherein the gas-liquid separating part is disposed at a higher position than the water containing vessel along a vertical direction.

4. The hydrogen producing apparatus according to claim 1, wherein at least one selected from the group consisting of the hydrogen-generating-material containing vessel and the water containing vessel is attached to the hydrogen producing apparatus in a detachable manner.

5. The hydrogen producing apparatus according to claim 1, wherein a heat insulator is further disposed in at least part of an outer periphery of the hydrogen-generating-material containing vessel.

6. The hydrogen producing apparatus according to claim 1, wherein the hydrogen-generating-material containing vessel and the water containing vessel are adjacent to each other via a heat insulator.

7. The hydrogen producing apparatus according to claim 1, wherein the hydrogen-generating-material containing vessel and the water containing vessel are made as one piece.

8. The hydrogen producing apparatus according to claim 1, wherein the hydrogen-generating-material containing vessel and the water containing vessel are deformable according to a reaction between the hydrogen generating material and the water.

9. The hydrogen producing apparatus according to claim 1, wherein the hydrogen-generating-material containing vessel contains the hydrogen generating material, and
   the hydrogen generating material is at least one metal selected from the group consisting of aluminum, silicon, zinc and magnesium, and alloys mainly containing at least one metallic element of aluminum, silicon, zinc and magnesium.

10. The hydrogen producing apparatus according to claim 1, wherein the hydrogen-generating-material containing vessel contains the hydrogen generating material and a heat generating material that reacts with water exothermically at room temperature, and
    the hydrogen generating material is at least one metal selected from the group consisting of aluminum, silicon, zinc and magnesium, and alloys mainly containing at least one metallic element of aluminum, silicon, zinc and magnesium.

11. The hydrogen producing apparatus according to claim 10, wherein the heat generating material is unevenly distributed in the hydrogen-generating-material containing vessel.

12. The hydrogen producing apparatus according to claim 1, wherein the hydrogen-generating-material containing vessel contains the hydrogen generating material and a heat generating material that reacts with water exothermically at room temperature,
    the hydrogen generating material is at least one metal selected from the group consisting of aluminum, silicon, zinc and magnesium, and alloys mainly containing at least one metallic element of aluminum, silicon, zinc and magnesium, and
    the heat generating material is arranged in such a manner as to be concentrated in the vicinity of the water supply portion.

13. The hydrogen producing apparatus according to claim 1, wherein the hydrogen-generating-material containing vessel contains the hydrogen generating material, and
    the hydrogen generating material is a metal, hydride.

14. The hydrogen producing apparatus according to claim 1, further comprising a trapping portion for trapping a by-product that is generated by a reaction between the hydrogen generating material and the water.

15. The hydrogen producing apparatus according to claim 14, wherein the trapping portion comprises an ion exchange resin.

16. The hydrogen producing apparatus according to claim 14, wherein the trapping portion comprises a chelate resin.

17. The hydrogen producing apparatus according to claim 14, wherein the trapping portion comprises at least one material selected from the group consisting of molecular sieves, zeolite, silica gel, activated carbon, alumina and water absorptive polymer.

18. A fuel cell system comprising:
    the hydrogen producing apparatus according to claim 1; and
    a fuel cell.

19. A fuel cell system comprising:
    the hydrogen producing apparatus according to claim 14; and
    a fuel cell.

20. The fuel cell system according to claim 19, wherein the fuel cell is a polymer electrolyte fuel cell.

* * * * *